(12) United States Patent
Ueno et al.

(10) Patent No.: US 6,601,462 B1
(45) Date of Patent: Aug. 5, 2003

(54) CAPACITIVE TORQUE SENSOR AND METHOD OF DETECTING TORQUE

(75) Inventors: Toru Ueno, Sendai (JP); Naoki Wako, Sendai (JP); Tetsuo Yoshida, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 09/831,486
(22) PCT Filed: Sep. 8, 2000
(86) PCT No.: PCT/JP00/06148
§ 371 (c)(1),
(2), (4) Date: May 9, 2001
(87) PCT Pub. No.: WO01/20285
PCT Pub. Date: Mar. 22, 2001

(30) Foreign Application Priority Data

Sep. 13, 1999 (JP) ............................................. 11-258733
Sep. 13, 1999 (JP) ............................................. 11-258951
Sep. 7, 2000 (JP) ....................................... 2000-271076

(51) Int. Cl.[7] .............................. G01L 3/14; G01L 1/22
(52) U.S. Cl. ............................... 73/862.337; 73/862.339
(58) Field of Search ................... 73/862.337, 862.339; 361/290; 324/660

(56) References Cited

U.S. PATENT DOCUMENTS

| | | | | |
|---|---|---|---|---|
| 2,260,036 A | * | 10/1941 | Kuehni | 73/779 |
| 3,487,402 A | * | 12/1969 | Hillhouse | 324/660 |
| 4,941,363 A | * | 7/1990 | Doemens et al. | 73/862.337 |
| 5,046,371 A | * | 9/1991 | Kronberg | 73/862.337 |

FOREIGN PATENT DOCUMENTS

| | | | | |
|---|---|---|---|---|
| JP | 02287232 | * | 11/1990 | G01L/3/10 |
| JP | 04166702 | * | 12/1992 | G01B/7/16 |
| JP | 5-332856 | | 12/1993 | |
| JP | 9-280973 | | 10/1997 | |

* cited by examiner

*Primary Examiner*—Hezron Williams
*Assistant Examiner*—Lilybett Martir
(74) *Attorney, Agent, or Firm*—Frishauf, Holtz, Goodman & Chick, P.C.

(57) ABSTRACT

A dielectric layer 32 variable in dielectric constant in dependence upon the strain is formed on at least a part of an outer peripheral surface of a bar 31 having a circular cross section. Interdigital electrodes are faced to the dielectric layer to thereby form a single capacitor. The interdigital electrodes have a plurality of linear electrodes 34a and 34b inclined at a predetermined inclination angle with respect to a center axis of the bar. Preferably, the dielectric layer is provided with a cylindrical insulator 33 faced thereto with a small gap kept therebetween, and the linear electrodes are formed on the peripheral surface of the cylindrical insulator. The linear electrodes may be formed directly on the surface of the dielectric layer.

8 Claims, 4 Drawing Sheets

PRIOR ART

CAPACITIVE TORQUE SENSOR AND METHOD OF DETECTING TORQUE

This application is a U.S. National Phase Application under 35 USC 371 of International Application PCT/JP00/06148 (not published in English) filed Sep. 8, 2000.

TECHNICAL FIELD

This invention relates to a torque sensor and a torque detecting method and, in particular, to a torque sensor and a torque detecting method which are suitable for an electric power steering apparatus in an automobile or a power-assisted bicycle.

BACKGROUND ART

Conventionally, in order to supplement a force to manipulate a steering wheel (hereinbelow, referred to as a wheel), an electric power steering apparatus has been developed. The electric power steering apparatus is an apparatus which detects a torque applied to the steering wheel from a driver and, in response to the torque thus detected, makes an electric motor provided in a steering mechanism generate a driving force for steering assistance. In comparison with a hydraulic power steering apparatus, the above-mentioned apparatus has such characteristics that no engine power is consumed to drive a hydraulic pump and that the controllability is excellent because the supplemental driving force is electrically controlled.

The above-mentioned electric power steering apparatus is required to have a torque sensor simple in structure and capable of carrying out non-contact detection from the viewpoint of reliability and cost. FIG. 1 shows one example of the torque sensor which is applicable for such use.

In the torque sensor of FIG. 1, a torsion bar 11 made of a material variable in magnetic permeability due to strain, that is, a magnetostrictive material is incorporated between an input shaft and an output shaft for input and output of the torque. On the outer periphery of the torsion bar 11, two coils 12 and 13 are placed with a given distance kept therebetween. On the surface of the torsion bar 11, elongated slits 14 inclined at ±45° with respect to its center axis are formed in correspondence to the two coils 12 and 13.

When the torque is produced between the input shaft and the output shaft, the torque is applied to the torsion bar 11 so that torsional strain is produced in the torsion bar 11. Generally, the torsional strain generated in a solid cylinder or a hollow cylinder is decomposed into elongation strain in a direction of 45° with respect to the longitudinal direction of the solid cylinder or the hollow cylinder and compression strain in a direction perpendicular thereto. Consequently, the elongation strain and the compression strain are respectively caused to occur in the directions of the slits 14 formed on the surface of the torsion bar 11. The magnetic permeabilities of the respective portions change in the manner such that one is increased while the other is decreased, and have levels substantially proportional to the torque applied.

As a result, the inductances of the two coils 12 and 13 change in the manner such that one is increased while the other is decreased. Each of these two coils 12 and 13 is connected to a ground terminal through a fixed resistance as an impedance element, and an a.c. voltage having a predetermined frequency is applied between the fixed resistance and the ground terminal. At this time, a terminal voltage of each of the coils 12 and 13 is supplied to a differential amplifying circuit. In this event, the differential amplifying circuit produces an output voltage proportional to the magnitude of the torque applied. Therefore, it is possible to detect the magnitude of the torque according to the above-mentioned output voltage.

Typically, an electric motor including a strong magnet is used in an automobile or a power-assisted bicycle. In order to avoid the influence of a magnetic field generated from the magnet, a robust magnetic shield is required. This brings about a drawback that the structure around the torque sensor becomes complicated.

Further, the electric power steering apparatus requires a steering angle sensor for detecting a steering direction in order to control the steering supplementing force produced by the electric motor by detecting a steering speed and a steering angle simultaneously when the torque applied to the wheel is detected as described above. The above-mentioned steering angle sensor generally adopts a method of detecting the N-pole and the S-pole of a multipolar ring-shaped magnet by the use of a Hall device. In order to prevent a magnetic field leaking from the ring-shaped magnet from influencing the above-mentioned magnetostrictive material, a shield for the torque sensor portion is required also. This results in a drawback that the structure becomes complicated.

Therefore, it is an object of the present invention to provide a capacitive torque sensor which does not require a magnetic shield and has a simple structure.

It is another object of the present invention to provide a torque detecting method using the above-mentioned capacitive torque sensor.

DISCLOSURE OF THE INVENTION

According to the present invention, there is provided a capacitive torque sensor including a bar having a circular cross-section, a dielectric layer which is formed on at least a part of an outer peripheral surface of the bar and which is variable in dielectric constant in dependence upon the strain, and a pair of interdigital electrodes facing the dielectric layer and forming a single capacitor, the interdigital electrodes comprising a plurality of linear electrodes inclined at a predetermined inclination angle with respect to a center axis of the bar.

According to the present invention, there is also provided a torque detecting method using a capacitive torque sensor comprising a bar having a circular cross-section, a dielectric layer which is formed on at least a part of an outer peripheral surface of the bar and which is variable in dielectric constant in dependence upon the strain, and an interdigital electrode capacitor facing the dielectric layer and inclined at a predetermined inclination angle with respect to a center axis of the bar, the method comprising the steps of activating a modulating operation in response to a change in capacitance of the interdigital electrode capacitor to produce a modulation frequency signal, and detecting a torque from the modulation frequency signal.

BEST MODE FOR EMBODYING THE INVENTION

Figure 1:
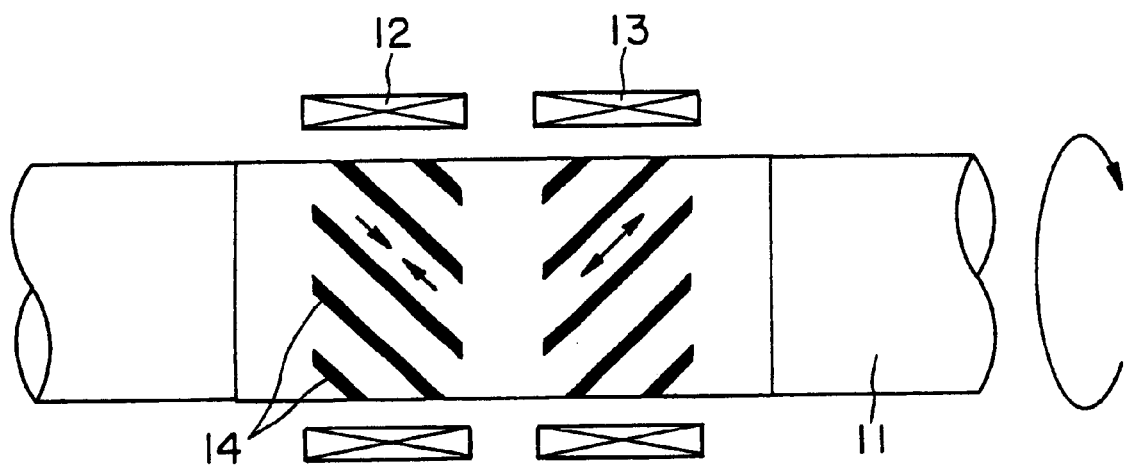
FIG. 1 is a view for describing a conventional torque sensor.
Figure 2:
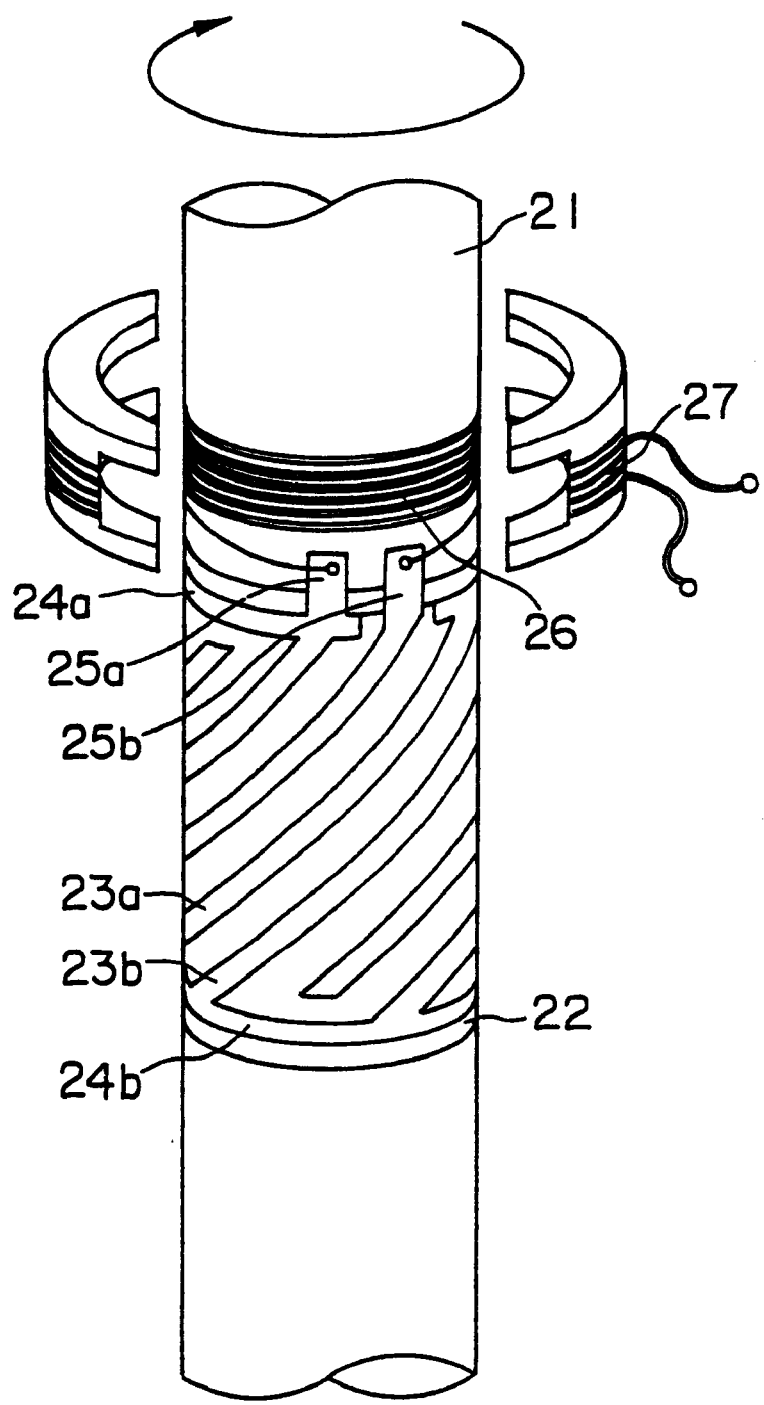
FIG. 2 is a perspective view of a capacitive torque sensor according to a first embodiment of the present invention.

Referring to FIG. 2, description will be made about a capacitive torque sensor according to a first embodiment of the present invention.

This capacitive torque sensor includes a circular bar 21 having a circular cross section and made of insulating plastic or insulating ceramics. The circular bar 21 is connected in series to and between an input shaft and an output shaft for input and output of a torque in a steering wheel. Accordingly, the circular bar 21 is rotated in response to manipulation of the wheel.

The circular bar 21 has an outer peripheral surface provided with a thick-film or a thin-film dielectric layer 22 directly formed thereon and made of a material variable in dielectric constant in dependence upon the strain. On the surface of the dielectric layer 22, linear electrodes (digital electrodes) 23a and 23b are formed to be inclined at a predetermined inclination angle of about 45° with respect to a center axis (the longitudinal direction) of the circular bar 21. The linear electrodes 23a and 23b are alternately connected to common electrodes 24a and 24b, respectively, to thereby form so-called interdigital electrodes or an interdigital electrode capacitor. Thus, a single capacitor having capacitance is formed. A pair of terminals 25a and 25b are connected to the interdigital electrodes.

A part of the circular bar 21 is provided with a first coil 26 wound along an outer periphery of the bar in a direction perpendicular to the axial direction of the bar to thereby form an inductor. This inductor is connected in parallel to the above-mentioned capacitor to thereby form a closed circuit. Specifically, the both ends of the first coil 26 are connected to the terminals 25a and 25b, respectively. In this case, the terminals 25a and 25b serve as connecting members which form a closed circuit. In addition, a second coil 27 is provided so as to face the first coil 26 with a small gap left therebetween. The second coil 27 is stationary.

Next, description will be made about the principle of operation of the capacitive torque sensor in FIG. 2.

When a steering wheel is manipulated, relative rotation force acts between the input shaft and the output shaft to thereby apply a torsional torque to the circular bar 21. Then, strain occurs in the dielectric layer 22 formed on the surface of the circular bar 21, resulting in a change in dielectric constant. In other words, the dielectric layer 22 has a strain to dielectric-constant-variation characteristic. The strain of the dielectric layer 22 can be decomposed into elongation strain in a direction of +45° and compression strain in a direction of −45° with respect to the torsional axis direction. Thus, in dependence upon the direction of the torsional torque, the dielectric constant changes in the direction in which the linear electrodes 23a and 23b of the interdigital electrodes face each other. Following this, the value of the capacitance between the terminals 25a and 25b changes. With reference to the above-mentioned change in capacitance, the magnitude of the torque being produced can be detected.

In order to detect the above-mentioned change in capacitance in a non-contact manner, the first coil 26 and the second coil 27 are electromagnetically coupled by means of the structure described above. With this structure, a change in capacitance formed by the interdigital electrodes is converted into a change in impedance of the coil 27, and the magnitude of torque can be detected from the latter change.

According to the capacitive torque sensor in FIG. 2, it is possible to detect the torque in a non-contact manner without relying on a magnetic shield and without being influenced by an external magnetic field. Further, the structure is simple and the reliability of detection can readily be improved.

The circular bar 21 may comprise a metal bar having conductivity and a plastic layer or a ceramic layer formed thereon and having a low dielectric constant.

By using a magnetic substance at the portion where the first coil 26 is provided, it is possible to improve electromagnetic coupling with the second coil 27 and to obtain a capacitive torque sensor with higher sensitivity.

Moreover, in case where a recessed portion for receiving the first coil 26 is formed along the circumference of the circular bar 21 and a recessed portion for receiving the second coil 27 is formed to face the above-mentioned recessed portion, the same effect is exhibited so that a capacitive torque sensor can easily be obtained.

In FIG. 2, the LC resonance inductor and the electromagnetic coupling transformer inductor have a common structure. However, with a structure in which these inductors are separated, a capacitive torque sensor can be similarly obtained.

Figure 3:
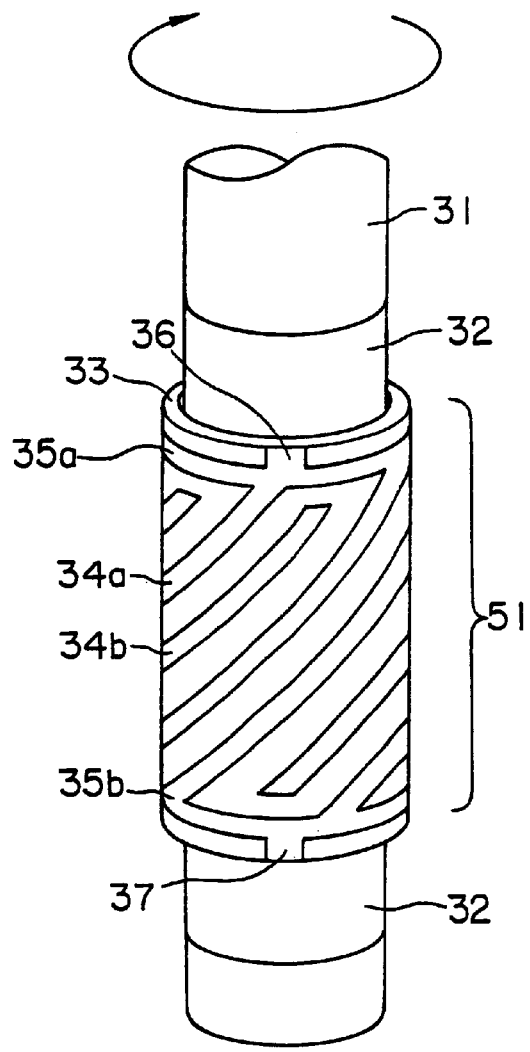
FIG. 3 is a perspective view of a capacitive torque sensor according to a second embodiment of the present invention.

Referring to FIG. 3, description will be made about a capacitive torque sensor according to a second embodiment of the present invention.

This capacitive torque sensor includes a circular bar 31 made of insulating plastic or insulating ceramics and having a circular cross section. The circular bar 31 is connected in series to and between an input shaft and an output shaft for input and output of a torque in a steering wheel. Accordingly, the circular bar 31 is rotated in response to manipulation of the wheel.

The circular bar 31 has a peripheral surface provided with a thick-film or a thin-film dielectric layer 32 formed at a part thereof and variable in dielectric constant in dependence upon the strain. A concentric cylindrical insulator 33 is fitted over the circular bar 31. The cylindrical insulator 33 faces the dielectric layer 32 with a small gap kept therebetween and is stationary. Preferably, a bearing is arranged in the small gap.

On the outer peripheral surface of the cylindrical insulator 33, linear electrodes 34a and 34b are formed to be inclined at a predetermined inclination angle of about 45° with respect to a center axis of the circular bar 31. The linear electrodes 34a and 34b are alternately connected to common electrodes 35a and 35b, respectively, to thereby form so-called interdigital electrodes or an interdigital electrode capacitor. Thus, a single capacitor having capacitance is formed. A pair of terminals 36 and 37 are connected to the interdigital electrodes.

Next, description will be made about the principle of operation of the capacitive torque sensor in FIG. 3.

When a steering wheel is manipulated, relative rotation force acts between the input shaft and the output shaft to thereby apply a torsional torque to the circular bar 31. Then, strain occurs in the dielectric layer 32 formed on the surface of the circular bar 31, resulting in a change in dielectric constant. In other words, the dielectric layer 32 has a predetermined strain to dielectric-constant-variation characteristic. Since the linear electrodes 34a and 34b are capacitively coupled to the dielectric layer 32 with a small gap left therebetween, capacitance between the terminals 36 and 37 changes following a change in dielectric constant of the dielectric layer 32. With reference to the abovementioned change in capacitance, the magnitude of the torque being produced can be detected.

According to the capacitive torque sensor in FIG. 3, it is possible to detect the torque without relying on a magnetic shield and without being influenced by an external magnetic field. Further, the structure is simple and an LC oscillation circuit can readily be formed.

The circular bar 31 may comprise a metal bar having conductivity and a plastic layer or a ceramic layer formed thereon and having a low dielectric constant. Further, the interdigital electrodes may be formed on an inner peripheral surface of the cylindrical insulator 33.

Figure 4:
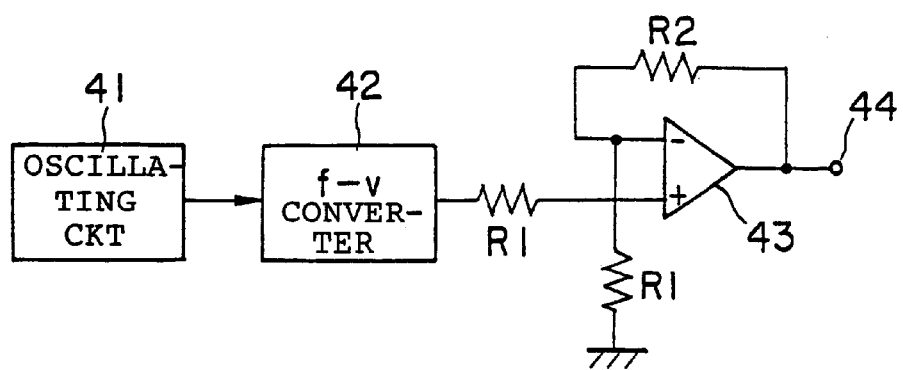
FIG. 4 is a circuit block diagram showing a torque detecting circuit using the capacitive torque sensor in FIG. 3.

Referring to FIG. 4 in addition, description will be made about a torque detecting circuit using the capacitive torque sensor in FIG. 3.

An oscillating circuit 41 is an LC oscillating circuit or an RC oscillating circuit including capacitance of the capacitive torque sensor in FIG. 3 and supplies a f-V converter 42 with a frequency corresponding to the change in capacitance of the capacitive torque sensor in FIG. 3. The f-V converter 42 converts the frequency into a voltage and supplies the voltage to an operational amplifier 43. From an output terminal 44 of the operational amplifier 43, an output signal representative of a torsional torque being applied is produced. Therefore, it is possible to accurately detect a very small torque.

Preferably, the frequency produced from the oscillating circuit 41 is supplied to a microcomputer which directly calculates the frequency, and the output signal is produced as a digital signal.

Figure 5:
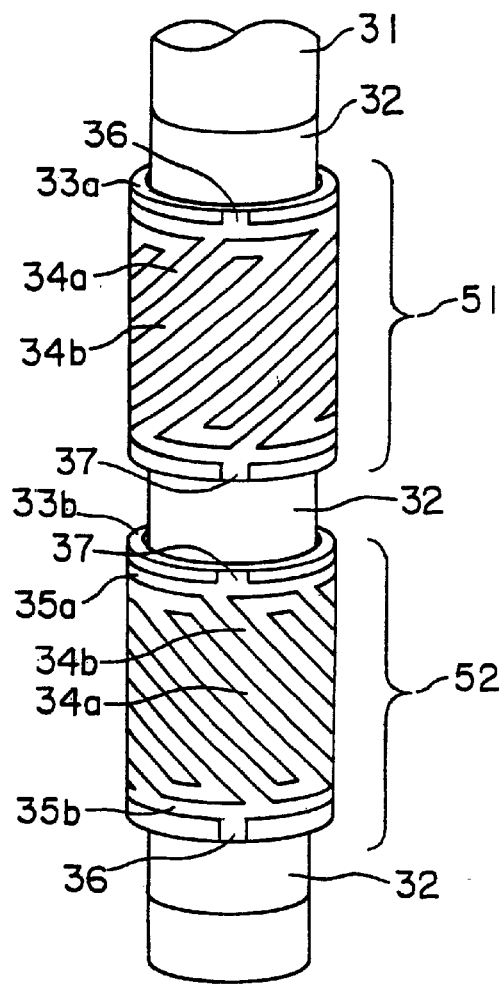
FIG. 5 is a perspective view of a capacitive torque sensor according to a third embodiment of the present invention.

Referring to FIG. 5, description will be made about a capacitive torque sensor according to a third embodiment of the present invention. Similar parts are designated by like reference numerals.

In the capacitive torque sensor in FIG. 5 also, a circular bar 31 has a surface provided with a thick-film or a thin-film dielectric layer 32 formed at a part thereof and variable in dielectric constant in dependence upon torsional strain. Two cylindrical insulators 33a and 33b are fitted over the circular bar 31. These cylindrical insulators 33a and 33b face each other with a small gap left therebetween, are placed in different regions on an outer peripheral surface of a dielectric layer 32 which are different in the axial direction of the circular bar 31, and are stationary. Preferably, a bearing is arranged in the small gap.

On the outer peripheral surface of each of the cylindrical insulators 33a and 33b, linear electrodes 34a and 34b are formed to be inclined at a predetermined inclination angle of about 45° with respect to a center axis of the circular bar 31. In one cylindrical insulator 33a and the other cylindrical insulator 33b, the inclining directions of the linear electrodes 34a and 34b are different from each other.

The linear electrodes 34a and 34b are alternately connected to common electrodes 35a and 35b, respectively, to thereby form so-called interdigital electrodes or an interdigital electrode capacitor. Thus, around the circular bar 31, a reference capacitor part 52 is formed in addition to a detection capacitor part 51 as shown in FIG. 3.

The reference capacitor part 52 has thermal characteristics equivalent to those of the detection capacitor part 51. Therefore, by correcting the change rate in capacitance of the detection capacitor part 51 with respect to the change in ambient temperature by the use of the change rate in capacitance of the reference capacitor part 52, it is possible to cancel the fluctuation in characteristics depending on the change in ambient temperature and to improve torque detecting sensitivity to a substantially twice level.

Figure 6:
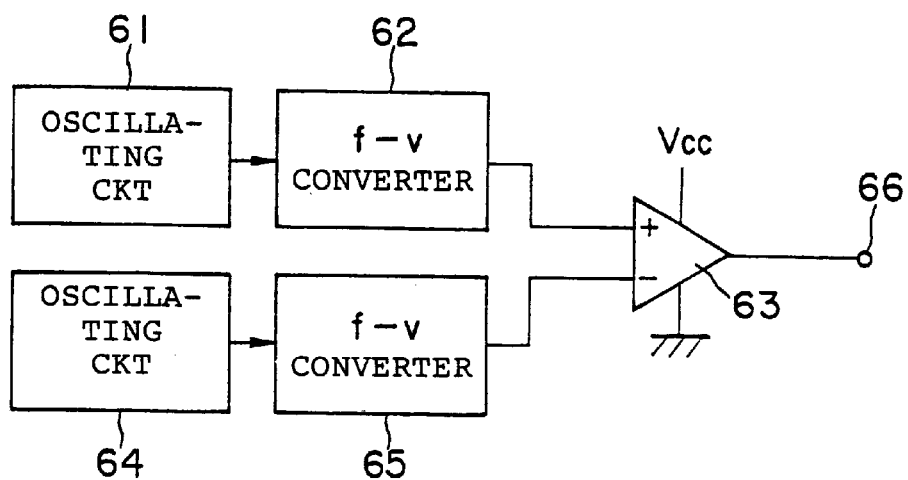
FIG. 6 is a circuit block diagram showing a torque detecting circuit using the capacitive torque sensor in FIG. 5.

Next referring to FIG. 6, description will be made about a torque detecting circuit using the capacitive torque sensor in FIG. 5.

An oscillating circuit 61 is an LC oscillating circuit or an RC oscillating circuit including capacitance of the detection capacitor part 51. The oscillating circuit 61 supplies a f-V converter 62 with a frequency corresponding to the change in capacitance of the detecting capacitor part 51. The f-V converter 42 converts the frequency into a voltage and supplies the voltage to a comparator 63.

An oscillating circuit 64 is an LC oscillating circuit or an RC oscillating circuit including capacitance of the reference capacitor part 52. The oscillating circuit 64 supplies a f-V converter 65 with a frequency corresponding to the change in capacitance of the reference capacitor part 52. The f-V converter 65 converts the frequency into a voltage and supplies the voltage to the comparator 63.

The comparator 63 calculates a difference between the voltages thus supplied and produces, from an output terminal 66 thereof, an output signal representative of a torsional torque being applied. In this manner, temperature correction is performed so that a small torque can accurately be detected even if the thermal environment is changed.

Preferably, the frequency produced from each of the oscillating circuits 61 and 64 is supplied to a microcomputer which directly calculates the frequency, and the output signal is produced as a digital signal.

In any one of the embodiments described above, it is possible to use, as the dielectric layer, a dielectric ceramics film which is used in a ceramic capacitor or the like. In case where the reference capacitor and the detection capacitor are substantially same in dielectric material, film thickness, and size of the interdigital electrodes, the reference capacitor and the detection capacitor need not be formed on the same surface but may be separately arranged provided that the thermal environments of the detection capacitor and the reference capacitor are considered to be equivalent.

Industrial Applicability

The capacitive torque sensor of the present invention is suitable as a torque sensor for use in an electric power steering apparatus in an automobile or a power-assisted bicycle.

What is claimed is:

1. A non-contact capacitive torque sensor comprising:
   a bar having a circular cross-section,
   a dielectric layer which is formed on at least a part of an outer peripheral surface of said bar and which is variable in dielectric constant in accordance with a strain applied to said dielectric layer, and
   a pair of interdigital electrodes facing said dielectric layer and forming a single capacitor,
   wherein said interdigital electrodes comprise a plurality of linear electrodes inclined at a predetermined acute inclination angle with respect to a center axis of said bar, and
   wherein said bar comprises a center conductor and a layer formed on a surface of said conductor and having a low dielectric constant.

2. A non-contact capacitive torque sensor comprising:

a bar having a circular cross-section, a dielectric layer which is formed on at least a part of an outer peripheral surface of said bar and which is variable in dielectric constant in accordance with a strain applied to said dielectric layer, a pair of interdigital electrodes facing said dielectric layer and forming a single capacitor, a first coil provided along the outer peripheral surface of said bar and forming one inductor, a connecting part connecting said capacitor and said inductor with each other to form a closed circuit, and a second coil electromagnetically coupled to said first coil with a small gap left therebetween, wherein said interdigital electrodes comprise a plurality of linear electrodes inclined at a predetermined acute inclination angle with respect to a center axis of said bar, wherein said linear electrodes are directly formed on a surface of said dielectric layer, and wherein said bar has a magnetic portion formed on at least a part thereof in a direction along the center axis of said bar, and said first coil is provided in said magnetic portion.

3. A capacitive torque sensor as claimed in claim 2, wherein said magnetic portion has an outside-facing recessed portion extending around the center axis of said bar, and said first coil is received in said outside-facing recessed portion.

4. A capacitive torque sensor as claimed in claim 3, further comprising an inside-facing recessed portion facing said outside-facing recessed portion in a radial direction, and wherein said second coil is received in said inside-facing recessed portion.

5. A non-contact capacitive torque sensor comprising:

a bar having a circular cross-section, a dielectric layer which is formed on at least a part of an outer peripheral surface of said bar and which is variable in dielectric constant in accordance with a strain applied to said dielectric layer, and a pair of interdigital electrodes facing said dielectric layer and forming a single capacitor, and a cylindrical insulator fitted to said bar and facing said dielectric layer with a small gap left therebetween, wherein said interdigital electrodes comprise a plurality of linear electrodes inclined at a predetermined acute inclination angle with respect to a center axis of said bar, and wherein said linear electrodes are formed on a peripheral surface of said cylindrical insulator.

6. A capacitive torque sensor as claimed in claim 5, wherein said interdigital electrodes are formed on an inner peripheral surface of said cylindrical insulator.

7. A capacitive torque sensor as claimed in claim 5, wherein said interdigital electrodes are formed on an outer peripheral surface of said cylindrical insulator.

8. A capacitive torque sensor as claimed in claim 5, further comprising:

an additional cylindrical insulator fitted to said bar and facing said dielectric layer with a small gap left therebetween, and a pair of additional interdigital electrodes formed on a peripheral surface of said additional cylindrical insulator and forming one capacitor, wherein said additional interdigital electrodes have a plurality of additional linear electrodes inclined at a predetermined inclination angle with respect to the center axis of said bar.

* * * * *